(12) United States Patent
Parrish et al.

(10) Patent No.: US 6,846,884 B2
(45) Date of Patent: Jan. 25, 2005

(54) CONTROL OF RESIN PROPERTIES

(75) Inventors: John R. Parrish, Cross Lanes, WV (US); Ivan J. Hartley, Victoria, TX (US); Lonnie L. Pinson, Goliad, TX (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 55 days.

(21) Appl. No.: 10/259,094

(22) Filed: Sep. 27, 2002

(65) Prior Publication Data

US 2004/0063871 A1 Apr. 1, 2004

(51) Int. Cl.$^7$ .................................................. C08F 2/34
(52) U.S. Cl. ............................ 526/73; 526/79; 526/901
(58) Field of Search ............................ 526/73, 79, 901

(56) References Cited

U.S. PATENT DOCUMENTS

| | | | |
|---|---|---|---|
| 3,341,503 A | 9/1967 | Paige et al. .............. 260/80.78 |
| 3,485,706 A | 12/1969 | Evans ......................... 161/72 |
| 3,645,992 A | 2/1972 | Elston ..................... 260/80.78 |
| 4,076,698 A | 2/1978 | Anderson et al. ......... 526/348.6 |
| 4,302,565 A | 11/1981 | Goeke et al. ................. 526/88 |
| 4,314,912 A | 2/1982 | Lowery, Jr. et al. ........ 252/429 |
| 4,322,027 A | 3/1982 | Reba ........................... 226/97 |
| 4,340,563 A | 7/1982 | Appel et al. ................ 264/518 |
| 4,413,110 A | 11/1983 | Kavesh et al. ........... 526/348.1 |
| 4,482,687 A | 11/1984 | Nishay et al. .............. 526/125 |
| 4,540,755 A | 9/1985 | Mayhew et al. ............. 526/100 |
| 4,547,475 A | 10/1985 | Glass et al. ................. 502/115 |
| 4,612,300 A | 9/1986 | Coleman, III .............. 502/113 |
| 4,619,980 A | 10/1986 | McDaniel et al. ............. 526/96 |
| 4,663,220 A | 5/1987 | Wisneski et al. ........... 428/221 |
| 4,668,566 A | 5/1987 | Braun ......................... 428/286 |
| 4,668,838 A | 5/1987 | Briggs ........................ 585/513 |
| 4,735,931 A | 4/1988 | McDaniel et al. .......... 502/107 |
| 4,804,714 A | 2/1989 | Olivo ......................... 525/240 |
| 4,937,299 A | 6/1990 | Ewen et al. ................ 526/119 |
| 5,066,736 A | 11/1991 | Dumain et al. ............... 526/82 |
| 5,106,806 A | 4/1992 | Job ............................. 502/111 |
| 5,115,068 A | 5/1992 | Bailey et al. ............. 526/348.5 |
| 5,132,380 A | 7/1992 | Stevens et al. ............. 526/126 |
| 5,137,994 A | 8/1992 | Goode et al. ................. 526/75 |
| 5,145,819 A | 9/1992 | Winter et al. ............... 502/117 |
| 5,189,192 A | 2/1993 | LaPointe et al. ............ 556/11 |
| 5,191,521 A | 3/1993 | Brosilow ..................... 364/160 |
| 5,218,071 A | 6/1993 | Tsutsui et al. .............. 526/348 |
| 5,231,151 A | 7/1993 | Spencer et al. ............. 526/116 |
| 5,244,987 A | 9/1993 | Bernard et al. ............... 526/78 |
| 5,272,236 A | 12/1993 | Lai et al. .................. 526/348.5 |
| 5,278,272 A | 1/1994 | Lai et al. .................. 526/348.5 |
| 5,317,036 A | 5/1994 | Brady, III et al. .......... 523/223 |
| 5,329,033 A | 7/1994 | Spaleck et al. ............... 556/53 |
| 5,374,696 A | 12/1994 | Rosen et al. ................ 526/126 |
| 5,453,410 A | 9/1995 | Kolthammer et al. ....... 502/155 |
| 5,455,366 A | 10/1995 | Rohrmann et al. ............ 556/8 |
| 5,470,993 A | 11/1995 | Devore et al. ............... 556/11 |
| 5,473,027 A | 12/1995 | Batchelor et al. ........... 526/106 |
| 5,494,874 A | 2/1996 | Rosen et al. ................ 502/155 |
| 5,532,394 A | 7/1996 | Rosen et al. ................. 556/11 |
| 5,608,019 A | 3/1997 | Cheruvu et al. ............ 526/129 |
| 5,627,242 A | 5/1997 | Jacobsen et al. ............. 526/60 |
| 5,665,800 A | 9/1997 | Lai et al. .................... 524/115 |
| 5,677,383 A | 10/1997 | Chum et al. ................ 525/240 |
| 5,703,187 A | 12/1997 | Timmers .................... 526/282 |
| 5,783,638 A | 7/1998 | Lai et al. .................... 525/240 |
| 5,844,045 A | 12/1998 | Kolthammer et al. ....... 525/240 |
| 5,844,054 A | 12/1998 | Samples et al. .............. 526/60 |
| 5,869,575 A | 2/1999 | Kolthammer et al. ....... 525/240 |
| 5,977,251 A | 11/1999 | Kao et al. ..................... 525/53 |
| 5,990,250 A | 11/1999 | Parrish et al. ................ 526/61 |
| 6,063,877 A | 5/2000 | Kocian et al. ................ 526/61 |
| 6,111,020 A | 8/2000 | Oriani et al. ............... 525/222 |
| 6,156,842 A | 12/2000 | Hoenig et al. .............. 525/171 |
| 6,188,178 B1 | 2/2001 | Van Gorkom et al. ... 315/169.1 |
| 6,190,768 B1 | 2/2001 | Turley et al. ............... 428/364 |
| 6,211,302 B1 | 4/2001 | Ho et al. .................... 525/333.5 |
| 6,365,681 B1 | 4/2002 | Hartley et al. ................ 526/61 |
| 6,384,157 B1 | 5/2002 | Cai et al. ...................... 526/88 |

FOREIGN PATENT DOCUMENTS

| | | | |
|---|---|---|---|
| EP | 0 416 815 A2 | 3/1991 | ........... C08F/10/00 |
| WO | 93/24533 | 12/1993 | ............. C08F/2/00 |
| WO | 97/26942 | 10/1997 | ........... C08F/10/00 |
| WO | 00/22489 | 4/2000 | ........... G05B/17/02 |

Primary Examiner—Robert D. Harlan
(74) Attorney, Agent, or Firm—Whyte Hirschboeck Dudek SC

(57) ABSTRACT

A method for controlling resin properties during the production of polyolefins is provided. The method utilizes coordinated manipulation of reaction temperature in combination with a secondary process variable to control resin flow properties to rapidly respond to manufacturing upsets or specification changes to minimize off-grade or transition polymer material when moving from one polymer grade to another, or during a disturbance in a steady state production.

40 Claims, 6 Drawing Sheets

CONTROL OF RESIN PROPERTIES

FIELD OF THE INVENTION

This invention relates generally to a polymerization system and method for controlling olefin polymerization processes, and more particularly, to a method to reduce the amount of off-grade polymer when changing from one grade of polymer to another or during a disturbance in a polymerization process.

BACKGROUND OF THE INVENTION

Changing from one grade of polymer to another requires a transition period for a polymerization reactor to switch over to new resin specifications and corresponding process conditions such as reaction temperature, reactants and reactant ratios. During the transition from one product to another, off-grade polymer material is produced that does not have the desired resin flow property (e.g., melt index), density, or other property of either the initial product or the desired target product. In addition, a polymerization reaction operating under "steady state" conditions can encounter variations that can result in the production of off-grade polymer material that can lead to loss of revenue and reactor shutdown. Since off-grade polymer material presents an economic loss, it is desirable, to minimize the length of time a reactor produces such material and the amount of material that is produced.

A number of methods have been described to reduce transient, off-grade polymer material. Such methods have involved feeding a polymerization retarder or catalyst poison (e.g., $CO_2$, $O_2$) into the reactor, adjusting automatic flow ratio controllers to a new value, removing reactant gases from the reactor, reducing the catalyst level, and/or adding a nonreactive gas such as nitrogen, among other remedial actions.

Despite existing approaches to limit off-grade material, there is a continuing need and desire to provide a more effective and efficient process to reduce the amount of off-grade polymer material produced during the transition to a new product or as a result of a fluctuation during steady state manufacture.

SUMMARY OF THE INVENTION

The invention is directed to a polymerization system and method of controlling resin properties during the production of polyolefins using a coordinated manipulation of reaction temperature and at least one secondary process control element such as gas phase composition or feeds. Close resin flow property control is achieved by manipulating temperature and secondary process control element(s) in a coordinated fashion. Use of temperature manipulation in coordination with gas composition as a secondary process control element allows for a rapid response to process upsets or in transitioning to a new product or grade to reduce the amount of off-grade resin material produced during transition or during steady state manufacture. In addition, the manipulation of temperature can reduce the loss of valuable gases by reducing the need to vent the reactor.

The method involves altering the reaction temperature as a "fast" process variable or parameter to which the reaction system responds at a relatively rapid rate, concurrently with altering a secondary or "slow" process variable such as gas composition which has a relatively slow effect on the reaction system due in part to constraints within the reaction system. The reaction temperature is manipulated about a target reaction temperature for a polymer product to force or speed the transition of the resin being produced to a desired resin flow property. In an embodiment of a transition process, the secondary process variable (e.g, gas composition) is modified and the reaction temperature is changed by up to about 20° C., more typically by about 1–3° C., either below the target reaction temperature of the desired polymer if the target temperature is lower than the reaction temperature, or above the target reaction temperature if higher than the reaction temperature. In an embodiment of a process involving an upset or disturbance, the secondary process variable (e.g., the gas composition) is modified and the temperature is moved above or below the target temperature to move the resin flow property (e.g., M.I.) to the desired value to compensate for the disturbance. As the secondary process variable (e.g., the altered gas composition) exhibits an effect on the resin flow property (e.g., M.I.) of the polymer being produced, the reaction temperature can be moved back toward the target reaction temperature. At that point, the altered secondary process variable (e.g., gas composition) provides a sufficiently rapid affect to move the averaged resin flow value of the polymer in the reactor toward the target value.

The invention combines the influences of reaction temperature and a secondary process control variable to quickly force a resin flow property (e.g., M.I.) to a chosen value over a short time period. By the use of a fast acting control effort, resin flow property variability is reduced. Manipulation of the reaction temperature and a secondary process variable (e.g., gas composition) can be coordinated with the desired resin flow property value using higher level control systems. A process model can be used to determine the manner in which the reaction temperature and secondary process variable (e.g., gas composition) are manipulated.

The method is utilized for controlling a resin flow property, such as melt index (M.I.), of a polyolefin in a polymerization reaction. The method comprises changing the reaction temperature of the reactor by either up to about 20° C. below the set or defined (target) reaction temperature for manufacture of the polyolefin if the target temperature is lower, or up to about 20° C. above the target temperature if higher, and concurrently modifying the inflow of one or more gases into the reactor to modify the molar gas ratios to produce polyolefin having the desired resin flow property value. The temperature is moved as quickly as possible within constraints of process limitations, for example, limits of the reactor as to how fast the temperature can physically be raised or lowered, and the effect of the temperature on resin properties (e.g., stickiness, etc.). The temperature can be moved, for example, by changing the set point on the temperature control to force heating or cooling of the reactor with an accompanying lag time for the actual change in temperature within the reactor. The temperature set point can be stepped up or down or follow a continuous path to increase or decrease.

The reaction temperature can then be moved toward the target reaction temperature to reduce its effect on resin flow properties as the effect of the gas composition on resin flow properties increases and the averaged resin flow value of the polyolefin within the reactor approaches the target resin flow value of the desired polyolefin. If desired, the reaction temperature and modified gas composition can be maintained at the altered level until the averaged resin flow value of the polyolefin approaches an acceptable range of the target resin flow value, and the reaction temperature can then be moved toward the target temperature as the averaged resin flow value approaches the target value. The gas composition and/or the reaction temperature can then be manipulated as needed to maintain an averaged resin flow value of the polyolefin in the reactor within acceptable limits of the target resin flow value.

In one embodiment, the method is employed for reducing off-grade polyolefin during an upset or disturbance in a continuous polymerization reaction by monitoring the resin flow property of the polyolefin in the reactor and comparing the value to the defined or target resin flow value of the desired polyolefin. Upon detecting a value outside a suitable range of the target resin flow value of the desired polyolefin, the reaction temperature is changed to up to about 20° C. below the target reaction temperature for the polyolefin if the target temperature is lower, or up to about 20° C. above the target temperature if higher, and the inflow of one or more gases is concurrently set to modify the gas composition in the reactor so as to move the resin flow value to the defined resin flow value for the polyolefin. As the averaged resin flow value of the polyolefin approaches the target resin flow value, the reaction temperature is advanced toward the target temperature. If desired, the altered reaction temperature and modified gas inflow can be maintained until the averaged resin flow value approaches an acceptable range of the target resin flow value of the polyolefin, whereupon the reaction temperature can then trend toward the target reaction temperature for the polyolefin. The reaction temperature and/or the gas inflow can be adjusted as needed to maintain the averaged resin flow value of polyolefin in the reactor within an acceptable range of the target value.

In another embodiment, the method is utilized in a continuous polymerization during a transition in the manufacture of a first polyolefin to a second polyolefin that is produced under a different reaction temperature to reduce off-grade polyolefin during the transition. The target reaction temperature for producing the second polyolefin can be compared to the current reaction temperature, and then the reaction temperature of the reactor changed to above or below the target temperature as appropriate, and the inflow of the reactant gases modified. In such a method, at the start of the transition, the reaction temperature is moved down to about 20° C. below the target reaction temperature for producing the second polyolefin if the target temperature is lower, or moved up to about 20° C. above the target temperature if higher, and, concurrently, the inflow of one or more gases is modified to alter the gas composition in the reactor. The reaction temperature is then moved toward the target temperature as the averaged resin flow value approaches the target value. If desired, the altered reaction temperature and gas composition can be maintained at the altered level until the averaged resin flow value of the overall polyolefin in the reactor is within an acceptable range of the target resin flow value of the second polyolefin, whereupon the reaction temperature of the reactor can be moved toward the target reaction temperature as the averaged resin flow value approaches the target resin flow value. The gas composition can be adjusted as needed to maintain the reaction temperature about the target temperature and provide the polyolefin with the desired resin flow property during steady state production. The reaction temperature can also be varied about the target temperature to maintain the desired flow properties.

In an exemplary gas phase polymerization process for producing polyolefins utilizing a chromium-based catalyst system in a fluidized bed reactor, the reactor bed temperature is manipulated to above or below target in response to process disturbances and transitions to speed the movement of the flow property value toward an aim value, while controlling the oxygen add-back flow to avoid large fluctuations in the oxygen flow. Such large fluctuations in oxygen add-back can cause undesirable variations in catalyst productivity and production rate. The reaction temperature moves toward the target temperature as the averaged resin flow property value moves toward the target value. The gas composition and/or temperature can be varied to maintain the desired flow properties of the polymer.

In an exemplary gas phase polymerization process of producing polyolefins utilizing a titanium-based catalyst system in a fluidized bed reactor, the reactor bed temperature is appropriately manipulated to above or below target while the hydrogen to π-olefin (e.g., ethylene) molar ratio is concurrently manipulated. The reaction temperature then moves toward the target temperature as the resin flow property value moves toward target value. The gas composition and/or temperature can be varied to maintain the desired flow properties of the polymer.

Total reliance on a slow acting control (e.g., gas composition) to drive process output to a product specification results in an extended transition period and excessive generation of non-spec product or large quantities of gas emissions. By comparison, the use of a fast acting control effort (temperature) in coordination with a slower acting control (e.g., gas composition) according to the invention results in reduced resin property variability and the production of less non-spec product. Advantageously, the present method provides close control of resin properties to desirably reduce the amount of off-grade material produced during grade transition or from disturbances during a process run, thus resulting in increased revenue. By moving the reaction temperature to above or below the target temperature, as is appropriate, in combination with a modification of gas inflow, the present method achieves a reduction, preferably at least an about 25% reduction, in the amount of off-grade polyolefin produced over a polymerization method in which the reaction temperature is incrementally moved toward the target reaction temperature for the desired polyolefin.

The process of the invention of varying the reaction temperature in combination with a variation in gas composition is particularly useful in moving a resin property toward target in situations in which modification of gas composition alone is not effective in moving a resin property (e.g., M.I.) near a set point, or it is desirable to limit increases in gas inflow, for example, the amounts of hydrogen ($H_2$) or hexane ($C_6$).

BRIEF DESCRIPTION OF THE DRAWINGS

Embodiments of the invention are described below with reference to the following accompanying drawings, which are for the purpose of illustrating embodiments only and not for purposes of limiting the same. Throughout the following views, reference numerals will be used in the drawings, and the same reference numerals will be used throughout the several views and in the description to indicate the same or like parts.

FIG. 2 is a graphical depiction of the effect of a change in reaction temperature in conjunction with a change in hydrogen concentration to rapidly modify the averaged bed melt index (M.I.) value.

FIG. 3 is a graphical depiction of the effect of a change in reaction temperature coordinated with a change in hydrogen concentration on the bed averaged density value.

FIG. 4 is a graphical depiction of the dynamics of changing in the hydrogen concentration in a gas phase polymerization reaction.

FIG. 5 is a graphical depiction of the dynamics of changing hexene/ethylene ratio in a gas phase polymerization reaction.

FIG. 6 is a graphical depiction of the dynamics of the bed reaction temperature in a gas phase polymerization reaction trending back toward target.

DETAILED DESCRIPTION OF THE PREFERRED EMBODIMENT

Figure 1:
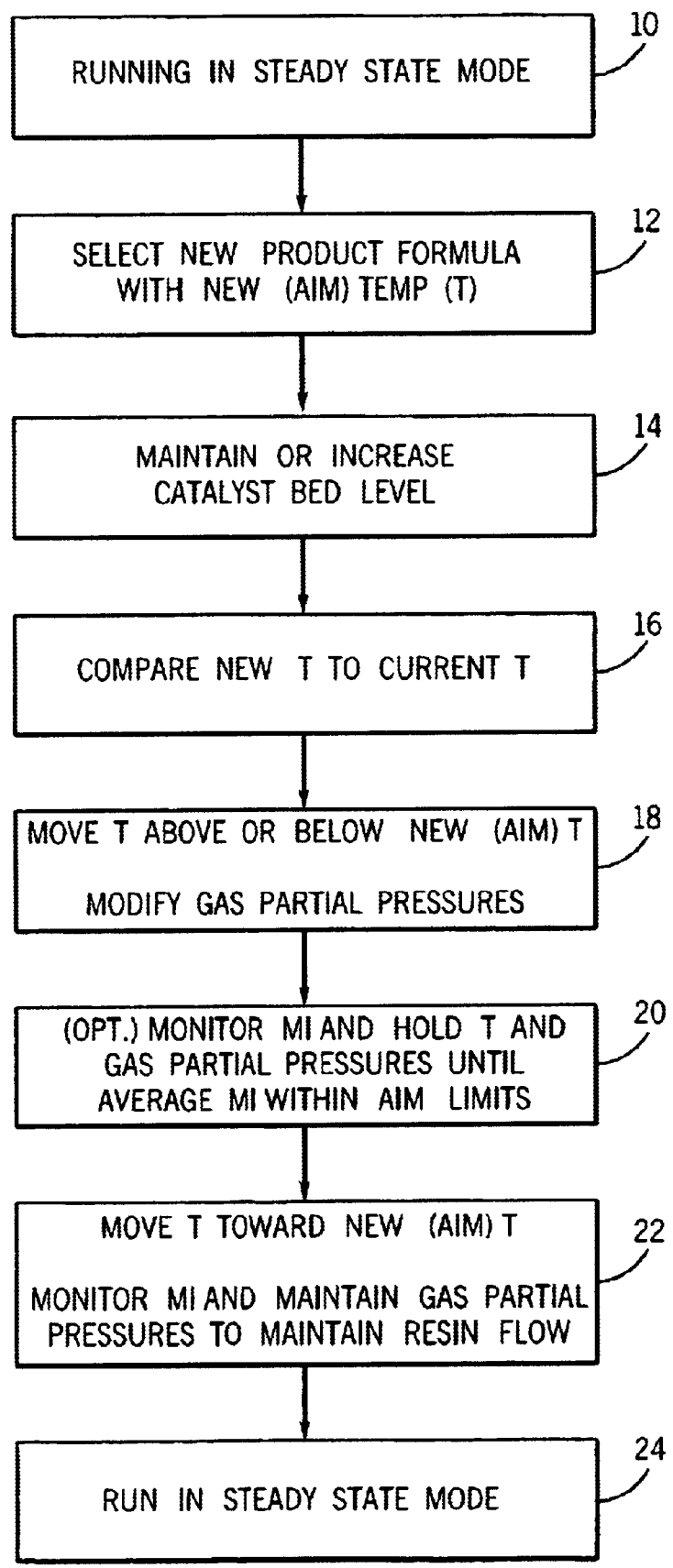
FIG. 1 is a flowchart illustrating an embodiment of the method of the invention to control a transition from a first resin product to a second resin product.

The present invention provides a method of reducing the amount of off-grade resin produced in a polymerization process during a transition from one polymer product to another or during a disturbance that occurs during a steady-state production operation. The method involves manipulating process parameters of a polymerization reactor to quickly respond to changes or variations in resin specifications and corresponding process conditions to control resin properties during the production of polyolefins. In particular, the invention is directed to controlling a reaction process and resin properties by manipulating the reaction temperature, which has a relatively fast effect on a resin flow properties, for example, the melt index of the resin, in coordination with a secondary process variable (e.g., gas composition) that has a relatively slow effect on the resin flow property, typically due to process constraints.

According to the present invention, manipulation of reaction temperature is used as the primary process control variable that drives or forces a resin flow property of the polymer product most rapidly to its target value. Temperature modification is used in conjunction with modification of a secondary process control variable that contributes to forcing the resin flow property to the target value but at a slower rate than provided by the reaction temperature. An exemplary secondary process control variable is the gas phase composition (e.g., reactant gas feeds) in the reactor, such as hydrogen/ethylene ($H_2/C_2$) molar ratio, hexene/ethylene ($C_6/C_2$) molar ratio, or other vapor composition, and oxygen ($O_2$) add-back in chromium-based catalyst systems.

Compared to other process variables, reaction temperature has been found to provide a relatively "fast" effect on modifying resin flow properties (i.e., melt index, flow index, and melt flow ratio). Secondary effects of reaction temperature relate to resin density, which is also affected by comonomer concentration, ethylene partial pressure, and cocatalyst changes such as triethylalumina (TEAL), for example.

The slow effect that certain process variables have on resin flow properties is generally due to limitations on how quickly the slow process parameter can be manipulated, in part, due to constraints related to process dynamics or operating economics. For example, it is generally difficult to quickly alter the gas composition in a reactor because the gases must be either consumed or vented out of-the-reactor to reduce the concentration. Excessive venting can result in raw material losses, which unfavorably effect operating costs. As a result, altering the gas composition in a reactor tends to proceed relatively slowly. By comparison, reaction temperature within a reactor can be increased or decreased relatively quickly by changing the reaction temperature. However, there are constraints that limit the amount of decrease or increase in reaction temperature, including, the reactor system itself, e.g., how much cooling the reactor can provide in a given time period, the effective productivity range of the catalyst being used as a function of temperature, and limiting in temperature increases to below the melting point of the resin, for example.

The method of the invention can be utilized in any reactor system having controls to facilitate modifying the reaction temperature and gas phase inflows. Generally, a reactor system will include mechanisms for adjusting the set point values for various process variables including reaction temperature, reactant gas partial pressures and flow rates, and catalyst and co-catalyst levels, for example, to enable switching from a first polymer product, or grade, made at a first temperature and under a first set of process conditions to a second polymer product, or grade, made at a second temperature and under a second set of process conditions, whether in transition between polymer products or during the manufacture of a particular polymer product that is subjected to fluctuations or disturbances in the grade.

In one embodiment, the method of the invention comprises manipulating reaction temperature in conjunction with gas composition to minimize off-grade polymer during a transition from one polymer product, or grade, to another.

In a polymerization process, the desired resin properties are selected, such as resin flow properties (melt index, flow index, and melt flow ratio) and density, among others. The process variables, including the catalyst system, reactants, gas phase composition and concentration, type of reactor, process temperature, pressure, and residence time, are selected to achieve the desired resin properties. Generally, the polymer products made by a given reactor system use the same gas phase reactants but in different ratios and at different reaction temperatures. Each of the polymer products can be made with a number of different resin properties, or grades. Each grade of polymer products has a narrow limit on its properties, e.g., density and melt index. Catalyst and reactant monomer feeds are introduced into the reactor in amounts to satisfy target resin properties and a desired resin production rate in pounds per hour, which can be accomplished with computerized controls or manual controls. The desired production rate in pounds per hour can be selected, and typically is about 3,000 to about 250,000 lbs. per hour in a commercial operation. The amount of catalyst fed to the reactor is the primary control of the production rate with an increase in the catalyst feed used to increase production rate.

Transition generally starts from an initial operating condition in which a first polymer product exhibiting a first resin flow property value (e.g., melt index) is made at a first set of reaction conditions including reaction temperature. A second or target polymer product having a different resin flow property value will require a different set of reaction conditions including a different reaction temperature that is either higher or lower.

According to the invention, in changing from one polymer product or grade of resin to a second (target) polymer product or grade, at the start of the transition, the current reaction temperature is moved to above or below the reaction temperature of the target polymer or grade, typically to at least about −0.5° C. to +0.5° C. to up to about −20° C. to +20° target temperature. For example, for applications in which the target reaction temperature is lower than the current temperature, the reaction temperature is moved to at least about 0.5° C. to up to about 20° C., more typically to about 1–3° C., below the target reaction temperature. Constraints on the reduction in reaction temperature include temperature limitations for effective catalyst activity and productivity. For applications in which the target reaction temperature is higher than the current temperature, the reaction temperature is moved at least about 0.5° C. to up to about 20° C., more typically to about 1–3° C., above the target reaction temperature. Factors that limit the amount of increase in reaction temperature include the melting point of the resin, for example.

Concurrent with the change in the reaction temperature to above or below the target temperature, the gas composition in the reactor is also adjusted, for example, by increasing or decreasing the inflow of one or more gases such as hydrogen ($H_2$) into the reactor. A change in gas composition in the reactor is generally limited by process system or process operating constraints. For example, hydrogen ($H_2$) flow can be limited by the maximum flow available from the hydrogen feed as well as the minimum possible feed (zero). A hexene ($C_6$) feed may be limited at the high end to ensure the resin does not become sticky. Similarly, a hexene feed might be limited at the low end to maintain the reactor in a condensing (vs. dry) mode operation. Such limits on gas inflow are generally determined by models, but can also be determined by direct measurement.

At the start of the transition, the reactor contains a large amount of resin having properties of the first polymer product. The melt index (M.I.) or other resin flow property of the polymer material being produced can be continuously monitored during the transition and compared to the resin flow property value. Monitoring can be conducted by direct measurement by known techniques in the art, or by use of a model based on gas composition, temperature, catalyst characteristics, and the like. Reaction temperature can likewise be monitored and compared to the target temperature.

After increasing/decreasing the reaction temperature to above/below the target temperature, and as the gas composition takes effect in moving the averaged resin flow property value (e.g., M.I.) of the overall polymer in the reactor toward the target value, the reaction temperature is likewise moved toward to the target reaction temperature. The reaction temperature is generally moved toward target by changing the temperature control set point. The reaction temperature can be moved toward the target temperature either gradually or rapidly, as appropriate given process constraints and the desire to minimize off-grade resin. If desired, the modified gas composition and reaction temperature can be maintained until the averaged resin flow property value is within an acceptable range of the target value, and the reaction temperature then moved toward the target reaction temperature. The gas composition can then be adjusted as needed to maintain the reaction temperature and the averaged resin flow properties at or about an acceptable range of the target reaction temperature and the resin flow value. The reaction temperature can also be adjusted about the target temperature to maintain the averaged resin flow property value at or about target.

An embodiment of a method of the present invention is described with reference to FIG. 1, which depicts a flow-chart of a polymerization process in transition from a first polymer product to a second (target) polymer product having a different melt index and reaction temperature.

The reactor is initially operated in a steady state making a first polymer product (10). A decision is then made to transition to a second product having a new formula (12), e.g., reactant gas (hydrogen/monomer) ratios and reaction temperature, for example. The following processes can then be performed simultaneously. The operator can allow the catalyst level to remain at the current level or can increase the catalyst feed (14) to either maintain a desired production rate or to influence resin properties. The reaction temperature for producing the second (target) product is compared to the current reaction temperature for producing the first product (16).

In one embodiment, if the target reaction temperature is lower, the reaction temperature is dropped to up to about 20° C. below the target temperature (18), more typically down to about 1–3° C. below the target temperature. Concurrently, the inflow of one or more gases into the reactor is altered to modify the gas composition. In an exemplary process, the partial pressure of hydrogen is dropped to decrease its concentration in the reactor.

In another embodiment, if the target reaction temperature of the second product is higher than that of the first product, the reactor temperature is increased to up to about 20° C. above the target reaction temperature, more typically up to about 1–3° C. above the target temperature. Concurrently, the inflow of one or more gases into the reactor is varied to modify the gas composition in the reactor.

Changes in the resin flow properties (e.g., M.I.) and reactor conditions are monitored during the transition.

Optionally, if desired, after the increase/decrease in the reaction temperature, the reaction temperature can be optionally maintained (below or above the target reaction temperature, as applicable) for a time period to force the polymerization reaction to produce polymer having the desired resin flow properties and move the averaged resin flow property value to within a predetermined acceptable range of the target resin flow value (20).

After increasing or decreasing the reaction temperature about the target temperature, the reaction temperature can then be moved to the aim or target reaction temperature as the averaged resin flow value approaches the target value (22). The reaction temperature can then be moved as needed about the target temperature to closely control the resin properties, with the gas composition adjusted as needed to maintain the reaction temperature and the resin flow properties of the polymer at or about the target values while the polymer is produced in a steady state mode (24).

In another embodiment, the method of the invention can be used to control off-grade resin during a steady state manufacture.

An upset in a reactor can be detected through monitoring one or more process variables and/or resin properties, and feeding the signals to a computer or advanced control system that can perform inferential calculations based on a model of the process. Typically, an upset involves a significant increase in temperature in the reacting system, but can also involve unusual pressure values, variations in the reactant feeds, irregular catalyst flow, and equipment malfunctions. An upset or disturbance can be detected in a manufacturing process by a shift away from a desired median set of values of a process variable (e.g., bed temperature, gas composition) or resin flow property value (e.g., M.I., density), indicating that the resin is off-grade.

In a steady state production in which an upset occurs, the resin can be rapidly returned to the target grade specification by moving the reaction temperature to above or below target reaction temperature according to the invention, and coordinating that change with a variation in gas composition. According to the invention, the reaction temperature is moved to at least about 0.5° C. to up to about 20° C., typically to about 1–3° C. above or below the target reaction temperature. As the modified gas composition takes effect in moving the averaged resin flow property value toward the target resin flow value, the reaction temperature is moved toward the target reaction temperature. If desired, the reaction temperature can be maintained (below or above the target reaction temperature, as applicable) for an extended time period to force the movement of the averaged resin flow property value to within an acceptable range of the target resin flow value, and the reaction temperature then moved toward the target reaction temperature. The gas composition can then be varied as needed to maintain the reaction temperature and resin flow property value about the target. Temperature can also be varied to maintain resin flow values at or about the target value.

The invention provides a process for polymerization of alpha-olefins under polymerization, conditions including the reaction temperature and the gas composition required for desired resin properties. In the process of the invention, the following steps can be carried out using computerized controls or manual controls. Components and conditions are selected so as not to adversely affect -reactor operation, resin properties, or violate the physical limitations of the reactor.

The process can involve the following steps:

establishing limits on the reaction temperature and the gas composition molar ratios;

establishing a desired resin flow property;

determining the desired reaction temperature and gas composition for producing the desired resin flow property;

determining the actual resin flow property as the polymerization progresses;

determining the decrease (or increase) in reaction temperature required to bring the reaction temperature to lower (or higher) than the desired reaction temperature to drive the averaged resin flow property value toward the desired value;

determining the gas composition molar ratios required to drive the averaged resin flow property value toward the desired value;

determining the amounts of gas components required for the molar ratio;

changing the reaction temperature and the gas inflow(s) into the reactor in the amounts necessary to satisfy the preceding steps;

allowing the reaction temperature to move toward the desired reaction temperature while the gas composition drives the averaged resin flow value toward the desired value; and adjusting the gas composition and/or the reaction temperature as indicated by analysis of the polymer produced to maintain the desired resin properties.

The amount of decrease (or increase) in reaction temperature required to bring the reaction temperature to lower (or higher) than the desired reaction temperature to drive the averaged resin flow property value toward the desired value is determined by the fluidized bed resin characteristic, value of the off-grade material, degree of off-grade material from specification, and the like. The change in temperature should be sufficient to have a rapid impact on the resin flow property of the polymer being produced.

The amount of variation in the gas composition molar ratios required to bring the actual resin flow property to drive the averaged resin flow property value toward the desired value is determined by the time cost of reactor vent emissions, the responsiveness of the reactor dynamics to the off-grade production, and the like. The molar ratio of gases refers to the flow of one gas in moles per hour divided by the flow of a second gas in moles per hour. The change in molar ratio(s) should be sufficient to have a contributory effect on the resin flow property of the polymer being produced. The amounts of gas components required for the molar ratio is determined by the desired resin properties. The inflow of the gases is controlled to maintain the appropriate concentrations necessary for the desired resin properties including flow properties and density.

A computer model can be used to predict the effect of temperature and gas composition and the time period required for each of those parameters (variables) to move the averaged resin flow property value, and to determine how much each of those parameters should be moved.

In either a transition or continuous production, monitoring and correction can be performed manually or by automation, e.g., by means of a computerized control system, which monitors the reaction temperature and resin flow properties, and changes the temperature control set point and gas inflow to force the polymerization reaction to make "in grade" material.

Process variables can be controlled through predictive computer models and coordinated control methods. A computer model of the reactor and process at hand can be developed as a database to include one or more algorithms executed using real time process measurement or data to control changes to the reaction temperature and the gas inflow. The details of generating a computer model of a reactor's transition and steady state operating properties are within the skill in the art, including techniques and mathematical relationships.

A sample of the polymer being produced can be drawn and analyzed for melt index (M.I.) value or other resin flow property value according to techniques known and used in the art. The monitored resin flow property can be related to the reaction temperature by an algorithm so that the resin flow property that is monitored can be modified by altering reaction temperature in coordination with the gas inflow. The invention can be implemented in a coordinated controller to manipulate reaction temperature as the primary process control variable and the gas inflow as a secondary process control variable. A commercially available microprocessor can be utilized to process data and provide the appropriate signals to controls for the temperature and gas inflow. The control algorithm used to relate the analyzed resin property of the polymer composition to the reaction temperature can be placed in a microprocessor-based controller. A multivariable modular controller and system, such as described in U.S. Pat. No. 5,191,521 (Brosilow), the disclosure of which is incorporated by reference herein, can be utilized to control multiple process variables through the use of interconnected controllers.

The method of the invention can be applied in a reactor system for a continuous gas phase polymerization reaction in a stirred or fluidized bed reactor, or for a solution polymerization process. The reactor system includes mechanisms for altering the reaction temperature and the inflow of gases into the reactor, among other control mechanisms.

A fluidized bed process for providing polymer resins is typically practiced by passing a gaseous stream containing one or more monomers continuously through a fluidized bed reactor under reactive conditions in the presence of a polymerization catalyst. The parts of a fluidized bed reaction system typically include a vessel, a bed, a gas distribution plate, inlet and outlet piping, one or more compressors, one or more cycle gas coolers (heat exchangers), and a product discharge system. Typical fluidized bed reactors and procedures are described, for example, in U.S. Pat. No. 6,384,157 (Cai et al.), U.S. Pat. No. 6,063,877 (Kocian et al.), U.S. Pat. No. 5,990,250 (Parrish et al., control of bed temperature), U.S. Pat. No. 5,844,054 (Samples et al.), U.S. Pat. No. 5,627,242 (Jacobson et al.), U.S. Pat. No. 4,482,687 (Noshay et al.), and U.S. Pat. No. 4,302,565 (Goeke et al.), the disclosures of which is incorporated by reference herein.

In a fluidized bed process, the product composition of α-olefin polymers can be varied by changing the molar ratios of monomers introduced into the fluidized bed. The resin product is continuously discharged in granular or particulate form from the reactor as the bed level builds up with polymerization. A gaseous stream of unreacted monomer is withdrawn from the reactor continuously and recycled into the reactor along with make-up monomer added to the recycle stream, and if desired, modifiers and/or an inert carrier gas. During the course of polymerization, the bed is comprised of formed polymer particles, growing polymer particles, and catalyst particles fluidized by polymerization and modifying gaseous components introduced at a flow rate or velocity sufficient to cause the particles to separate and act as a fluid. The production rate can be controlled in part by adjusting the catalyst feed rate. The hydrogen/monomer molar ratio or other reactant concentrations (e.g., comonomer feed, chain termination agent feed such as hydrogen or a poison such as oxygen) can be adjusted to control average molecular weights.

The residence time of the mixture of reactants including gaseous and liquid reactants, catalyst, and resin in the fluidized bed is generally about 1 to about 12 hours, and the total pressure in the fluidized bed reactor is generally about 100 to about 600 psi (pounds per square inch). Partial pressure of the primary α-olefin is set according to the amount of polymer desired. The balance of the total pressure is provided by α-olefins other than the primary α-olefin and/or inert gases such as nitrogen and inert hydrocarbons. The temperature in the reactors is generally in the range of about 10° C. to about 130° C.

A stirred-tank reaction is typically practiced using a two-phase (gas/solid) stirred bed, back mixed reactor. A typical stirred tank reactor is described, for example, in U.S. Pat. No. 5,844,054 (Samples et al.), the disclosure of which is incorporated by reference herein. In general, a set of four "plows" mounted horizontally on a central shaft in a vertical cylindrical chamber rotate to keep the particles in the reactor mechanically fluidized. A disengager vessel is mounted atop the vertical cylinder on the reactor. Gas is continually recirculated through both the reactor and disengager via a blower so that the gas composition is homogeneous throughout. Reactor pressure used is typically in the range of about 300 to about 450 psig. Partial pressures of monomers and hydrogen (for molecular weight control) are typically about 150 to about 300 psig. Gas composition can be measured at time intervals by a gas chromatograph analyzer. The reactor is typically cooled by an external jacket of chilled glycol to maintain a reactor temperature of about 10° C. to about 110° C. Catalyst precursor can be fed either dry or as a slurry. The reactor is typically run in a continuous mode in which granular polymer is withdrawn while the polymerization is in progress.

A typical run in either a fluidized bed reactor or a stirred tank reactor commences with monomers being charged to the reactor and feeds adjusted until the desired gas composition is reached. An initial charge of cocatalyst is added prior to starting catalyst feeding in order to scavenge any poisons present in the reactor. After the catalyst feed starts, monomers are added to the reactor sufficient to maintain gas concentrations and ratios. Cocatalyst feed rate is maintained in proportion to the catalyst feed rate. A start-up bed can be used to facilitate stirring and dispersal of catalyst during the initial part of the operation. After the desired batch weight is made, the reactor is vented, and monomers are purged from the resin with nitrogen. The batch is then discharged into a box, open to the atmosphere, unless other catalyst deactivation measures are specified.

A conventional system for conducting a solution polymerization process comprises a single loop reactor or dual loop reactor. Flow loop recycling reactors are described, for example, in U.S. Pat. No. 5,977,251 and WO97/36942 (Kao et al., to The Dow Chemical Company), the disclosures of which are incorporated by reference herein. A flow loop reactor includes a monomer inlet, catalyst inlet, solvent inlet, and a product outlet, and other features including, for example, an additive inlet, a static mixer, recycling line, and purification beds. A pump moves the reactant materials and polymer around the flow loop.

In such a system, monomer/comonomer and a chain termination agent can be flowed into a solvent delivered through the solvent inlet, and then introduced into the flow loop reactor at a monomer inlet. Catalyst and cocatalyst are combined to form a catalyst solution, a mixture with solid activated catalyst suspended therein, or a slurry of support particles with adsorbed catalyst suspended in a solvent media, which is injected or flowed through the catalyst inlet into the flow loop. Polymer is flowed out of the reactor through the polymer outlet. In a continuous system, some of the material in the reaction stream flows continuously past the product outlet and back through the loop.

The polymer produced can be a polyolefin, e.g., homopolymer or copolymer of ethylenically and/or acetylenically unsaturated monomers. Such monomers include $C_2$–$C_{20}$ α-olefin monomers including, but are not limited to, ethylene, propylene, isobutylene, 1-butene, 1-pentene, 1-hexene, 4-methyl-1-pentene, 1-decene, 1-octene, 1-nonene, 1-undocene, 1-dodecene, 1-tridecene, 1-tetradecene, 1-pentadecene, among others. Other monomers include styrene, $C_1$–$C_4$ alkyl substituted styrenes, tetrafluoroethylene, vinylbenzocyclobutene, dienes such as 1,4-hexadiene, dicyclopentadiene, ethylidenenorbornene, 1,7-octadiene and 1,9-decadiene, and cycloalkenes such as cyclopentene, cyclohexene and cyclooctene.

The various olefin polymerization reactors can be utilized and adjusted to produce a wide variety of polymer products. Exemplary polymers that can be produced in accordance with the invention include homopolymers and copolymers of polyethylene, polypropylene, and $C_3$–$C_{12}$ α-olefins; terpolymers of ethylene, at least one $C_3$–$C_{12}$ α-olefin and a diene such as ethylene-propylene-diene monomer (EPDM); polybutadiene, polyisoprene, polystyrene; and other rubbers. Generally, the polymer products made by a given reactor system use the same reactants but in different ratios and at different temperatures. Each of these polymer products can be made with a number of different resin properties, or grades. Each grade of polymer product has a narrow limit on its properties, e.g., density and melt index.

The reactors can be utilized to prepare various polymer types including, but not limited to, homogeneous polymers, heterogeneous polymers, substantially linear polymers, substantially random ethylene/styrene interpolymers, and olefin-based elastomers.

Homogeneous linear ethylene polymers can be prepared in conventional polymerization processes using Ziegler-type catalysts such as, for example, zirconium and vanadium catalyst systems, as exemplified in U.S. Pat. No. 3,645,992 to Elston, incorporated herein by reference. U.S. Pat. No. 4,937,299 to Ewen et al. and U.S. Pat. No. 5,218,071 to Tsutsui et al., each of which is incorporated herein by reference, disclose the use of metallocene catalysts, such as catalyst systems based on zirconium and hafnium, for the preparation of homogeneous linear ethylene polymers. Homogeneous linear ethylene polymers are typically characterized as having a molecular weight distribution, $M_w/M_n$, of about 2. Commercially available examples of homogeneous linear ethylene polymers include those sold by Mitsui Petrochemical Industries as Tafmer™ resins and by Exxon Chemical Company as Exact™ resins.

Heterogeneous linear ethylene polymers are available from The Dow Chemical Company as Dowlex™ LLDPE and as Attane™ ULDPE resins. Heterogeneous ethylene polymers are typically characterized as having molecular weight distributions, $M_w/M_n$, in the range of from 3.5 to 4.1. Heterogeneously branched ethylene polymers are characterized as a mixture of interpolymer molecules having various ethylene to comonomer molar ratios, and a short chain branching distribution index (SCBDI) less than about 30 percent. Heterogeneous polymers also have multiple melting peaks (i.e., exhibit at least two distinct melting peaks). All known heterogeneously branched ethylene polymers are linear and have no measurable or demonstrable long chain branching. Heterogeneous linear ethylene polymers can be prepared via the solution, slurry or gas phase polymerization of ethylene and one or more optional α-olefin comonomers in the presence of a Ziegler-Natta catalyst, by processes such as are disclosed in U.S. Pat. No. 4,076,698 (Anderson et al.) and U.S. Pat. No. 5,231,151 (Spencer et al.), incorporated herein by reference. Ziegler-Natta type polymerization processes are also described, for example, in U.S. Pat. No. 4,314,912 (Lowery, Jr. et al.), U.S. Pat. No. 4,612,300 (Coleman, III), U.S. Pat. No. 5,869,575 and U.S. Pat. No. 5,844,045 (Kolthammer et al.) and U.S. Pat. No. 5,231,151 (Spencer et al.) (all to The Dow Chemical Company), the disclosures of which are incorporated by reference herein.

Substantially linear ethylene polymers (SLEPs) are homogeneously polymers having long chain branching, and are described, for example, in U.S. Pat. Nos. 5,272,236, 5,278,272, 5,665,800 and 5,783,638 (Lai et al., to Dow Chemical), the disclosures of which are incorporated by reference herein. The term "substantially linear" means that, in addition to the short chain branches attributable to homogeneous comonomer incorporation, the ethylene polymer has long chain branches, such that the polymer backbone is substituted with an average of 0.01 to 3 long chain branches/ 1000 carbons. The melt index for SLEPs is generally at least about 0.1 grams/10 minutes (g/10 min) up to about 100 g/10 min. SLEPs are made by the Insite™ Process and Catalyst Technology, and are available from The Dow Chemical Company as Affinity™ polyolefin plastomers and from DuPont Dow Elastomers, LLC as Engage™ polyolefin elastomers. SLEPs can be prepared via the solution, slurry, or gas phase, preferably solution phase, polymerization of ethylene and one or more optional α-olefin comonomers by a continuous process in the presence of a constrained geometry catalyst, such as is disclosed, for example, in European Patent Application No. 416,815-A, U.S. Pat. Nos. 5,132,380, 5,189,192, 5,374,696, 5,453,410, 5,470,993, 5,494,874, and 5,532,394, incorporated herein by reference.

Substantially random interpolymers can be prepared by polymerizing an α-olefin(s) with a vinyl or vinylidene aromatic monomer(s) and/or hindered aliphatic or cycloaliphatic vinyl or vinylidene monomer(s). Substantially random interpolymers are described, for example, in U.S. Pat. No. 6,211,302 (Ho et al.) U.S. Pat. No. 6,190,768 (Turley et al.), U.S. Pat. No. 6,156,842 (Hoenig et al.), and U.S. Pat. No. 6,111,020 (Oriani et al.), the disclosures of which are incorporated by reference herein. The preparation of substantially random interpolymers includes polymerizing a mixture of polymerizable monomers in the presence of one or more metallocene or constrained geometry catalysts in combination with various cocatalysts. Operating conditions include pressures from atmospheric up to 3000 atmospheres and temperatures from −30° C. to 200° C. Examples of suitable catalysts and methods for preparing the interpolymers are described in EP 0,416,815(B1) and U.S. Pat. No. 5,703,187 (Timmers), the disclosures of which are incorporated by reference herein.

An example of olefin-based elastomers is a terpolymer made from ethylene-propylene diene monomer (EDPM). A process for preparing EPM polymers is described, for example, in U.S. Pat. No. 3,341,503 (Paige et al., Uniroyal, Inc.), the disclosures of which are incorporated by reference herein. An exemplary catalyst system for preparing EDPM comprises a vanadium compound such as vanadium oxytrichloride or tetrachloride, a co-catalyst that is typically an organoaluminum compound, and an activator such as a nitropropane and quinone.

Any catalyst conventionally employed to produced the above-mentioned polymers can be used for polymerization in the process of the invention. Such catalysts can include Phillips catalysts, Ziegler catalysts, Ziegler-Natta catalysts containing transition metals such as vanadium, chromium, titanium, and metallocenes. Examples of useful metallocene catalysts known in the art are disclosed, for example in U.S. Pat. No. 5,455,366 (Rohrmann), U.S. Pat. No. 5,329,033 (Spaleck et al.), U.S. Pat. No. 5,317,036 (Brady et al.), U.S. Pat. No. 5,145,819 (Winter et al.), and U.S. Pat. No. 5,106, 806 (Job), the disclosures of which are incorporated by reference herein.

Homogeneous catalysts employed in the production of a homogeneous ethylene interpolymer include metallocene species based on monocyclopentadienyl transition metal complexes described in the art as constrained geometry metal complexes (CGC catalysts), including titanium complexes. Useful metallocene species include constrained geometry metal complexes as disclosed in U.S. Pat. Nos. 5,869,575 and 5,844,045 (Kolthammer et al.), U.S. Pat. Nos. 5,783,638, 5,665,800, 5,278,272 and 5,272,236 (Lai et al.), U.S. Pat. No. 5,703,187 (Timmers), and U.S. Pat. No. 5,677,383 (Chum et al.), all to The Dow Chemical Company, the disclosures of which are incorporated by reference herein.

Heterogeneous catalysts that can be employed include typical Ziegler-type catalysts. Heterogeneous catalysts comprise a supported transition metal compound (e.g., a titanium compound or a combination of a titanium compound and a vanadium compound) and a cocatalyst/activator. Examples of such catalysts are described in U.S. Pat No. 5,231,151 (Spencer et al.), U.S. Pat. No. 4,612,300 (Coleman, III), U.S. Pat. No. 4,547,475 (Glass et al.), U.S. Pat. No. 4,314,912 (Lowery, Jr. et al.), and U.S. Pat. No. 4,076,698 (Anderson et al.), all to The Dow Chemical Company the disclosures of which are incorporated by reference herein.

Examples of chromium-based catalysts are described, for example, in U.S. Pat. No. 4,540,755 (Mayhew et al.), U.S. Pat. No. 4,619,980 (McDaniel), U.S. Pat. No. 4,668,838 (Briggs), U.S. Pat. No. 4,735,931 (McDaniel), U.S. Pat. No. 5,066,736 (Dumain et al.), U.S. Pat. No. 5,244,987 (Bernard et al.), U.S. Pat. No. 5,115,068 (Bailey et al.), U.S. Pat. No. 5,137,994 (Goode et al.), U.S. Pat. No. 5,473,027 (Batchelor et al.), and U.S. Pat. No. 4,804,714 (Olivo), the disclosures of which are incorporated by reference herein. Chromium-based catalysts also include other fluoride and titanium modified chromium catalysts and silyl chromates. In a chromium-based catalyst system, oxygen can be used to modify the production rate and resin properties, particularly the flow properties of the resin, typically either the melt index or flow index, at a set oxygen to α-olefin molar ratio and catalyst feed rate to achieve desired resin properties and a desired production rate.

Conventional additives that can be introduced into the resin include, for example, antioxidants, ultraviolet absorbers, antistatic agents, photosensitizers, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents.

Various articles can be prepared from the olefin polymer products using a conventional olefin fabrication technique. A wide variety of resins can be produced that can be used in injection molded, blow molded, roto-molded products, wire coating, piping and tubing, and films. Useful articles include films such as cast, blown and extrusion coated types of films; fibers such as staple fibers, spunbonded fibers, or melt blown fiber systems (using, e.g., systems as disclosed in U.S. Pat. No. 4,340,563 (Appel et al., to Kimberly-Clark); U.S. Pat. No. 4,663,220 (Wisneski et al., to Kimberly-Clark); U.S. Pat. No. 4,668,566 (Braun, to Kimberly-Clark); or U.S. Pat. No. 4,322,027 (Reba, to Crown Zellerbach); and gel spun fiber systems (e.g., the system disclosed in U.S. Pat. No. 4,413,110 (Kavesh et al., to Allied Corporation), both woven and nonwoven fabrics such as spunlaced fabrics (as disclosed in U.S. Pat. No. 3,485,706 (Evans)), or structures made from such fibers, including, for example, blends of these fibers with other fibers, e.g., PET or cotton; and molded articles such as articles made using an injection molding process, a blow molding process, or a rotomolding process. The polymer products described herein are also useful for wire and cable coating operations, shrink film applications as well as in sheet extrusion for vacuum forming operations. Fabricated articles made from ethylene polymer blends comprising at least one homogeneously branched substantially linear ethylene/α-olefin interpolymer and at least one heterogeneously branched ethylene polymer, are described by Chum et al., in U.S. Pat. No. 5,677,383. Compositions comprising olefin polymers can be formed into fabricated articles such as those mentioned using conventional polyolefin processing techniques, which are well known to the skilled in the art of polyolefin processing.

The following examples are illustrative of the method and system of the invention.

EXAMPLE 1

Polyethylene Production

The example shows how the method of the invention of changing the reaction temperature to below target and altering the gas phase composition can be used to rapidly move the production of one polymer to another with a shortened transition time.

A computer model was run to simulate the alteration of the bed averaged melt index (M.I.) of polyethylene produced in a gas phase polymerization reaction between ethylene and hexene in a gas phase polyethylene (PE) fluidized bed reactor.

A set of reaction conditions were picked to simulate a real plant operation.

Initial reaction conditions:
Production rate (average): 60,000 lbs./hour
Product density: 0.926±0.001 g/cm$^3$
Melt index: 37±2 g/10 min.
$H_2$ partial pressure=55 psi
$C_2$ partial pressure=120 psi
$C_6$ partial pressure=16 psi
$H_2/C_2$ molar gas phase ratio=0.46
$C_6/C_2$ molar gas phase ratio=0.13
Bed temperature=104° C.+1.5° C.
Catalyst: titanium-based catalyst Target reaction conditions:
Production rate (average): 60,000 lbs./hour
Product density: 0.926±0.001 g/cm$^3$
Melt index: 20±2 g/10 min.
$H_2$ partial pressure=47 psi
$C_2$ partial pressure=120 psi
$C_6$ partial pressure=19 psi
$H_2/C_2$ molar gas phase ratio=0.39
$C_6/C_2$ molar gas phase ratio=0.16
Bed temperature=98° C.+1.5° C.
Catalyst: titanium-based catalyst A simulated transition was initiated from the initial product to the target product, with the following changes:
Melt index: decrease of 17+2 g/10 min. (46%)
Density: no change
Reaction temperature: decrease of 6° C.

The catalyst in the reactor was maintained at a constant bed level. Through the transition period, resin having a melt index between 35 to 22 g/10 min. was considered to be off-grade.

At the start of the transition, the reaction temperature was moved to 1.5° C. below the final target temperature value (i.e., set at 98° C.). The $H_2$ and $C_6$ flows were modified to move the $H_2/C_2$ and $C_6/C_2$ molar gas phase ratios to the target resin conditions. The hydrogen partial pressure was reduced from 55 psi to 47 psi. The ethylene ($C_2$) partial pressure was maintained at 120 psi, and the hexene ($C_6$) partial pressure was raised from 16 psi to 19 psi.

After 2:24 hours, the bed average melt index was at 22 g/10 min., which was within an acceptable range (i.e., within 2 g/10 min.) of the melt index of the target grade (i.e., 20 g/10 min.). During that time, the bed temperature was gradually moved to the target reaction temperature of 98° C. as the MI moved toward the target value.

Figure 2:
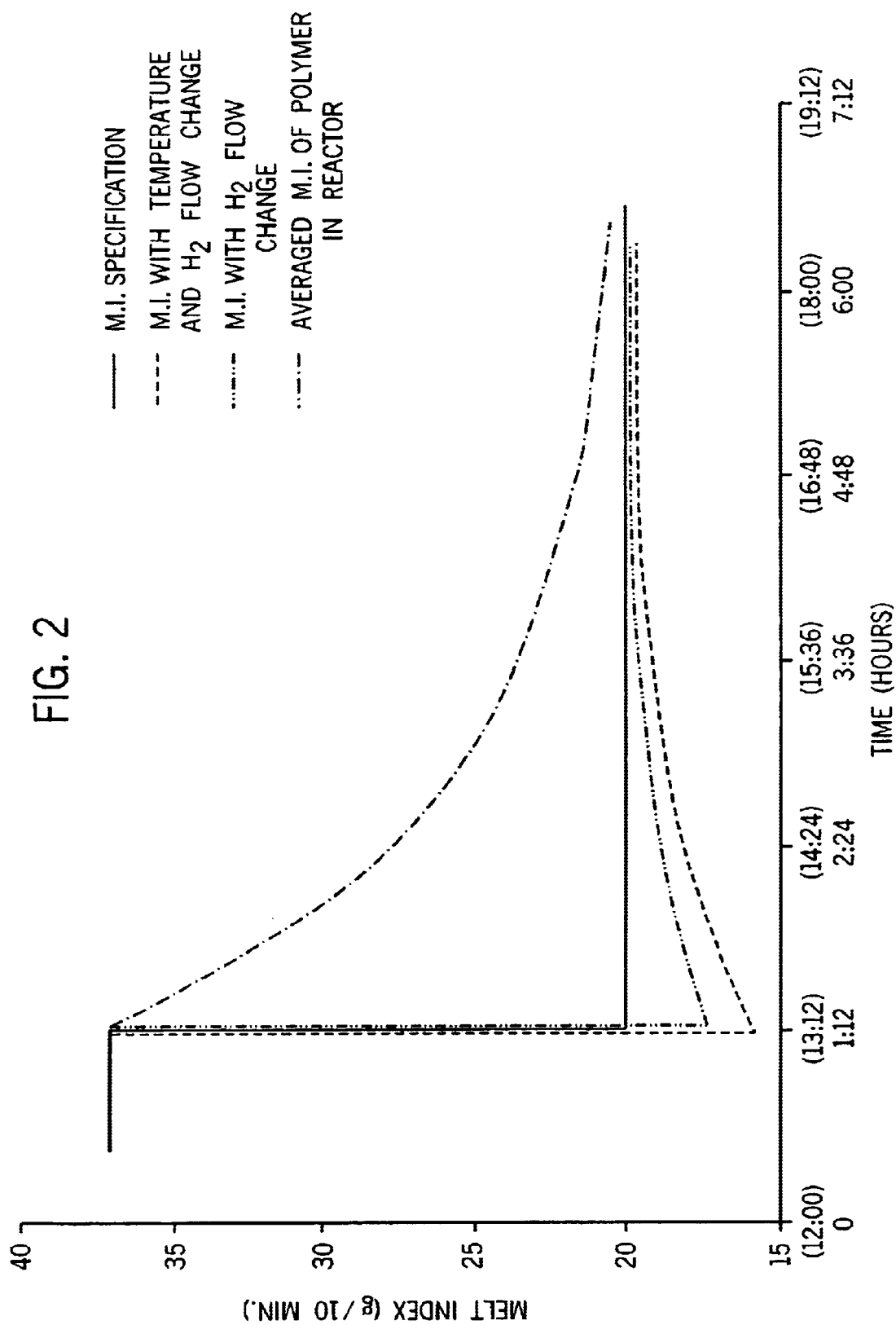
FIGS. 2–6 are graphical depictions depicting the results of a computer simulation of a transition showing the effect of changing various parameters on the transition in the production of a first polyethylene to a target polyethylene.

FIG. 2 illustrates the results of the computer simulation showing the dynamics of decreasing the reactor temperature to below the target temperature on the bed averaged melt index of the overall resin in the reactor. The change in the specification of the resin from an initial melt index of 37 g/10 min. to a melt index of 20 g/10 min. for the target product is represented by the solid line (1).

At the start of the transition, the bed temperature was initially moved to 96.5° C., which is 1.5° C. below the target temperature of the target resin, in order to drive the resin flow property (melt index) rapidly to target. As the averaged resin melt index neared the target value, the temperature also increased toward the target temperature.

The dashed line (- - -) represents the melt index of the currently produced resin when both the bed temperature was moved from 104° C. to 96.5° C. (to overshoot the 98° C. target temperature by −1.5° C.) and the hydrogen flow into the reactor was shut off. By comparison, the dotted line (•••) illustrates the effect of only shutting off the hydrogen flow without a corresponding drop in reaction temperature on the averaged melt index value of the currently produced resin.

The bed averaged melt index of the resin in the reactor over the transition period is represented by the sloping dotted/dashed line (-•-•- ). The line shows a decrease in the averaged melt index of the resin from 37 to 22 g/10 min., which is within an acceptable range of within 2 g/10 min. of the target melt index (i.e., 20 g/10 min.) over a time period of 2:24 hours.

About 150,000 lbs. of off-grade resin was generated during the 2:24 hour transition period.

By comparison, in a simulation of a conventional process-in which the bed temperature was gradually decreased to the target temperature value but without the overshoot below the target reaction temperature, the transition period to production of in-grade (second) polymer lasted a longer period of time and generated about 200,000 lbs. of off-grade resin.

The simulation of the method according to the invention showed a 25% reduction in off-grade generation over the conventional method.

Figure 3:
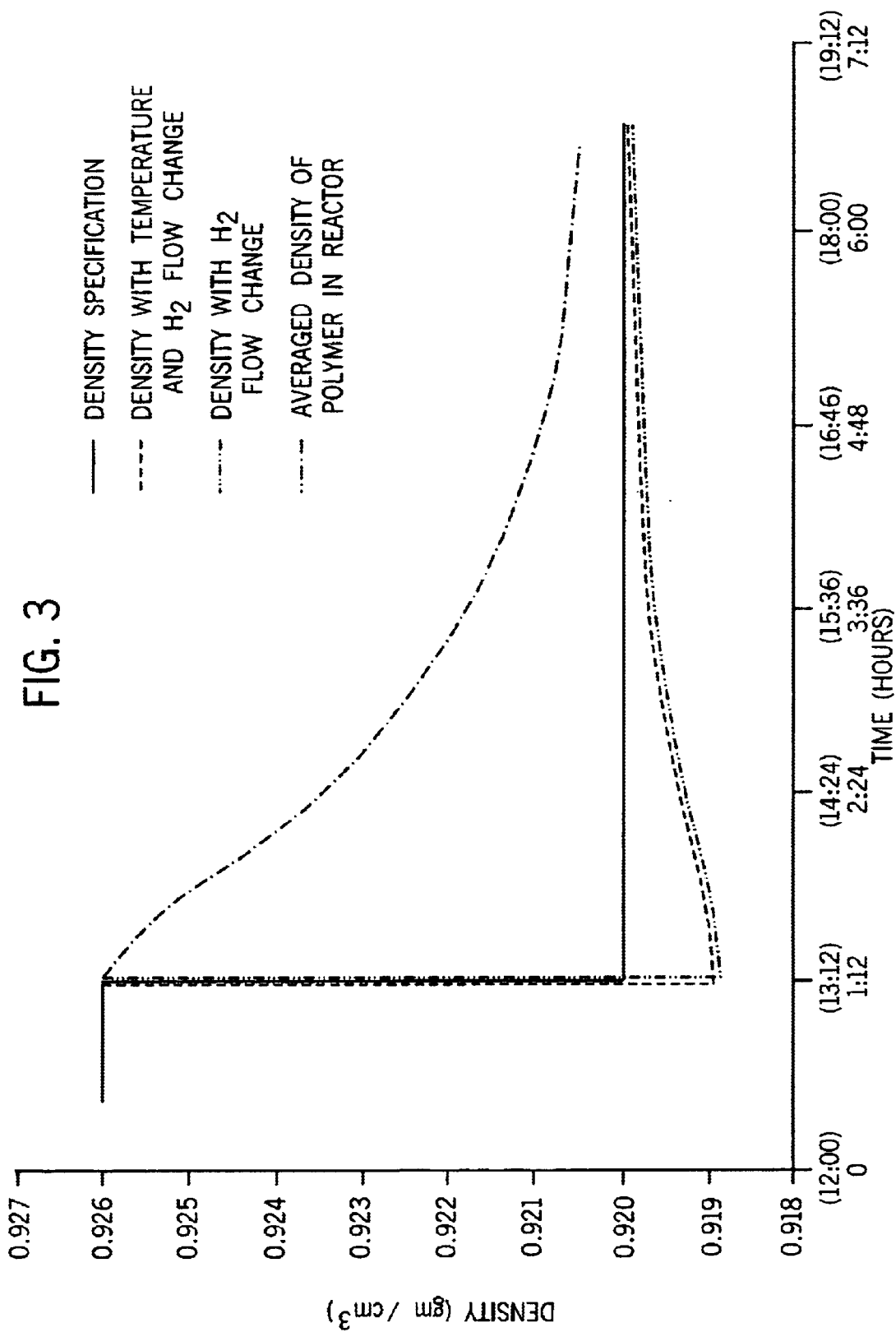

FIG. 3 illustrates the dynamics of rapidly changing the bed temperature to below the target temperature on the bed averaged density of resin in the reactor. The change in the specification of the resin from an initial density value of 0.926 to 0.92 g/cm$^3$ for the target product is represented by the solid line (⌐).

The bed averaged density of resin in the reactor over the transition period is represented by the sloping dotted/dashed line (-•-•-). The dashed line (- - -) corresponds to the density of the resin currently being produced when the bed temperature is moved to overshoot the target bed temperature by −1.5° C. in combination with a cut-off of the flow of hydrogen into the reactor. The dotted line (•••) shows the current resin density when only the flow of hydrogen into the reactor is cut-off. The overlapping lines indicate that initially dropping the bed temperature to below target did not significantly affect the bed averaged density so as to force it to a target value.

The illustrated example demonstrates that the present method of reducing the reaction temperature to below the target temperature, coordinated with a variation in the reactant gas (hydrogen) concentrations, significantly reduces the off-grade generated resin. The transition volume of off-grade resin produced during the period of passing from a bed averaged resin melt index of 35 to 22 g/10 min. showed a reduction from 200,000 lbs. produced in the conventional process to 150,000 lbs. produced according to the method of the invention, which was a 25% reduction in volume of off-grade resin.

EXAMPLE 2

Polyethylene Production: Dynamics of Changing Composition

The simulations of Example 2 are similar to Example 1, but detail the dynamics of changing the inflow of reaction gases into a reactor during a transition period.

Figure 4:
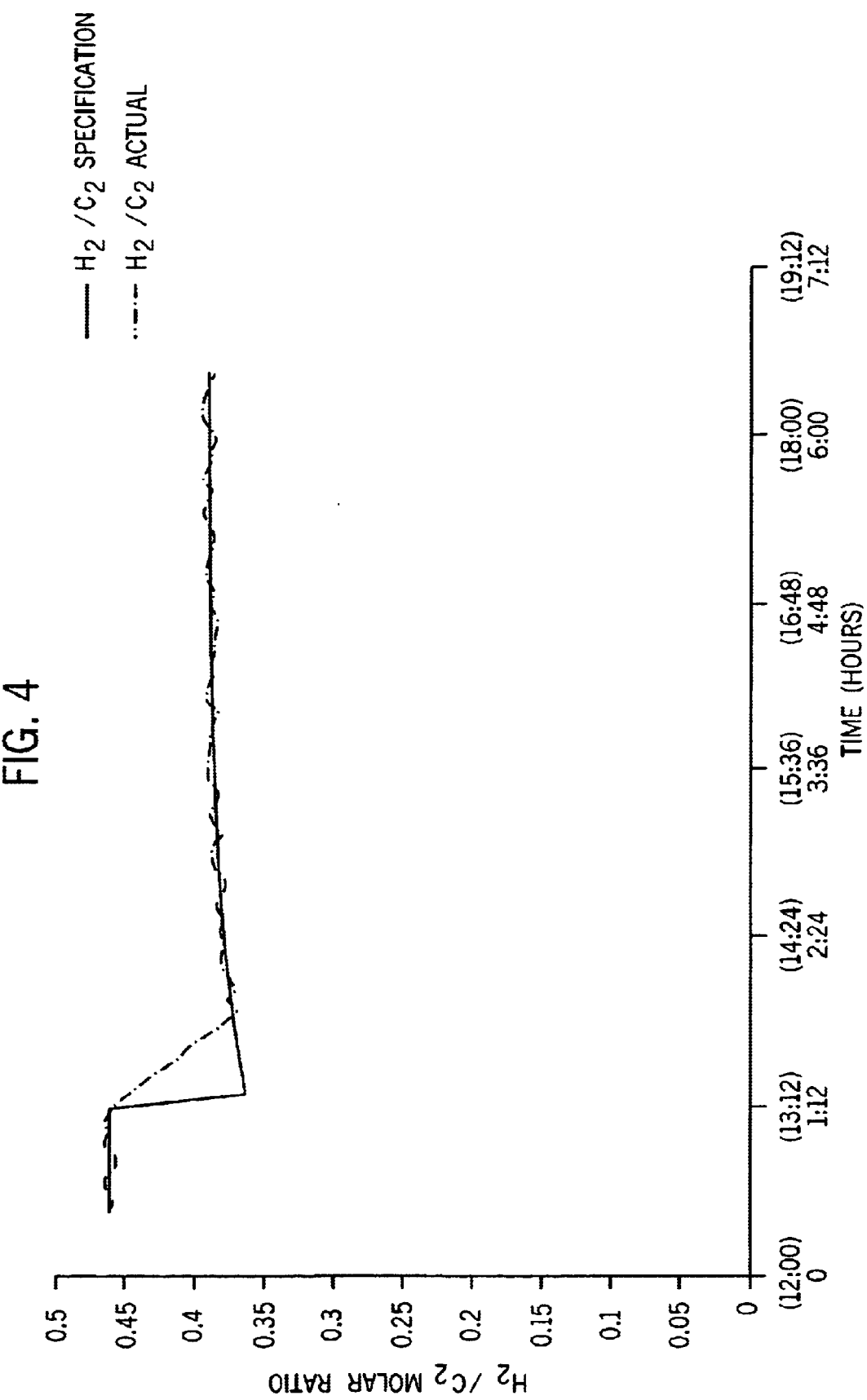

FIG. 4 illustrates the dynamics of changing the inflow of hydrogen($H_2$) into the reactor. The solid line (⌐) represents the change in specification from a hydrogen/ethylene ($H_2/C_2$) molar ratio of 0.46 to 0.36. The dotted/dashed line (-•-•-) represents the actual $H_2/C_2$ molar ratio in the reactor. The results show a lag time of about 45 minutes to decrease the amount of hydrogen in the reactor to achieve the target $H_2/C_2$ molar ratio.

Figure 5:
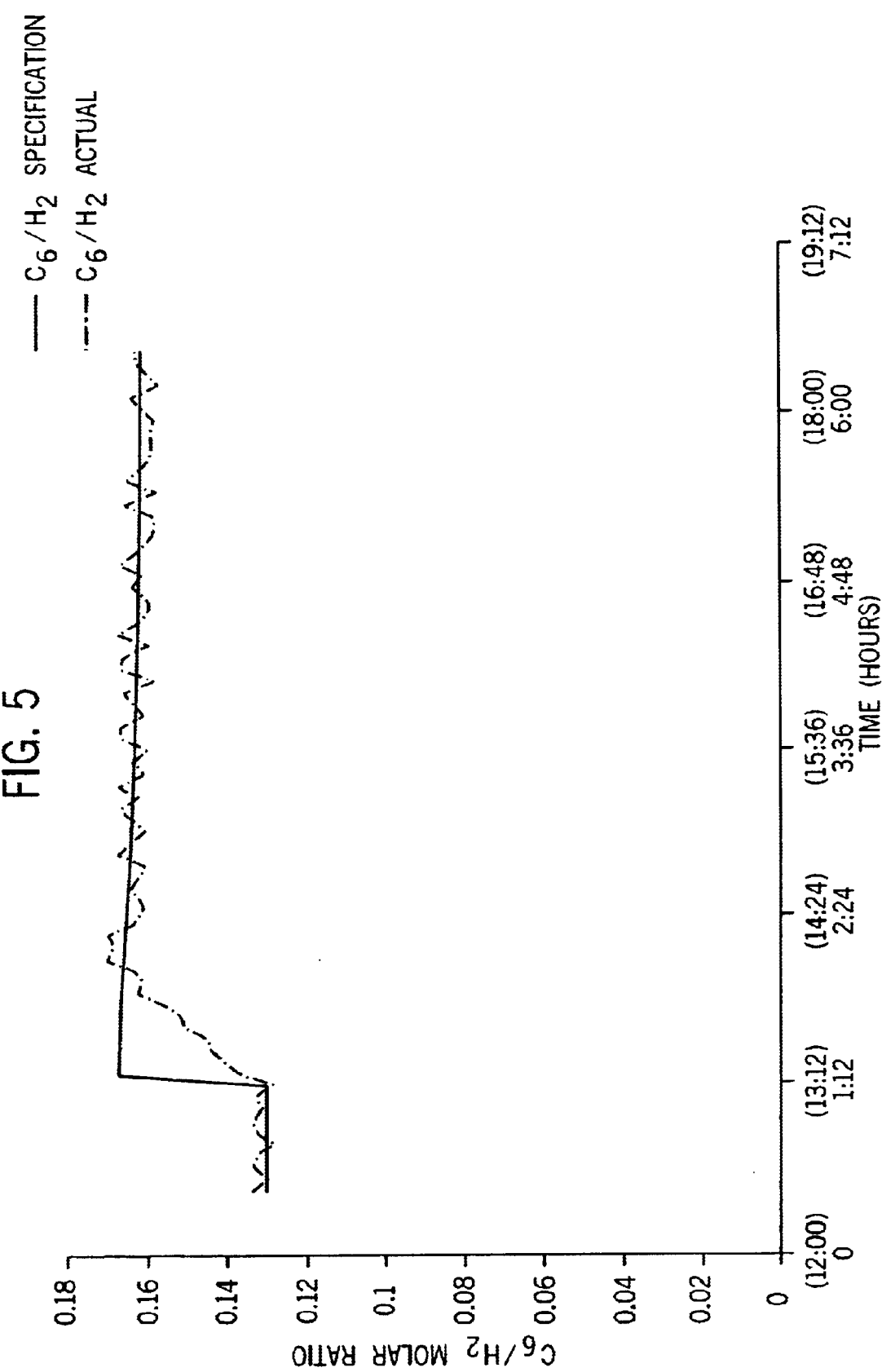

FIG. 5 illustrates the dynamics of changing the inflow of hexene ($C_6$) into the reactor. The solid line (⌐) represents the change in specification from a hexene/ethylene ($C_6/C_2$) of 0.13 to 0.165. The dotted/dashed line (-•-•-) represents the actual $C_6/C_2$ molar ratio in the reactor. The results show a lag time of about one (1) hour to increase the amount of hexene in the reactor to achieve the target $C_6/C_2$ molar ratio.

EXAMPLE 3

Polyethylene Production: Dynamics of Changing Temperature

The simulation of Example 3 is similar to Example 1, but details the dynamics of changing the reaction temperature during a transition period.

Figure 6:
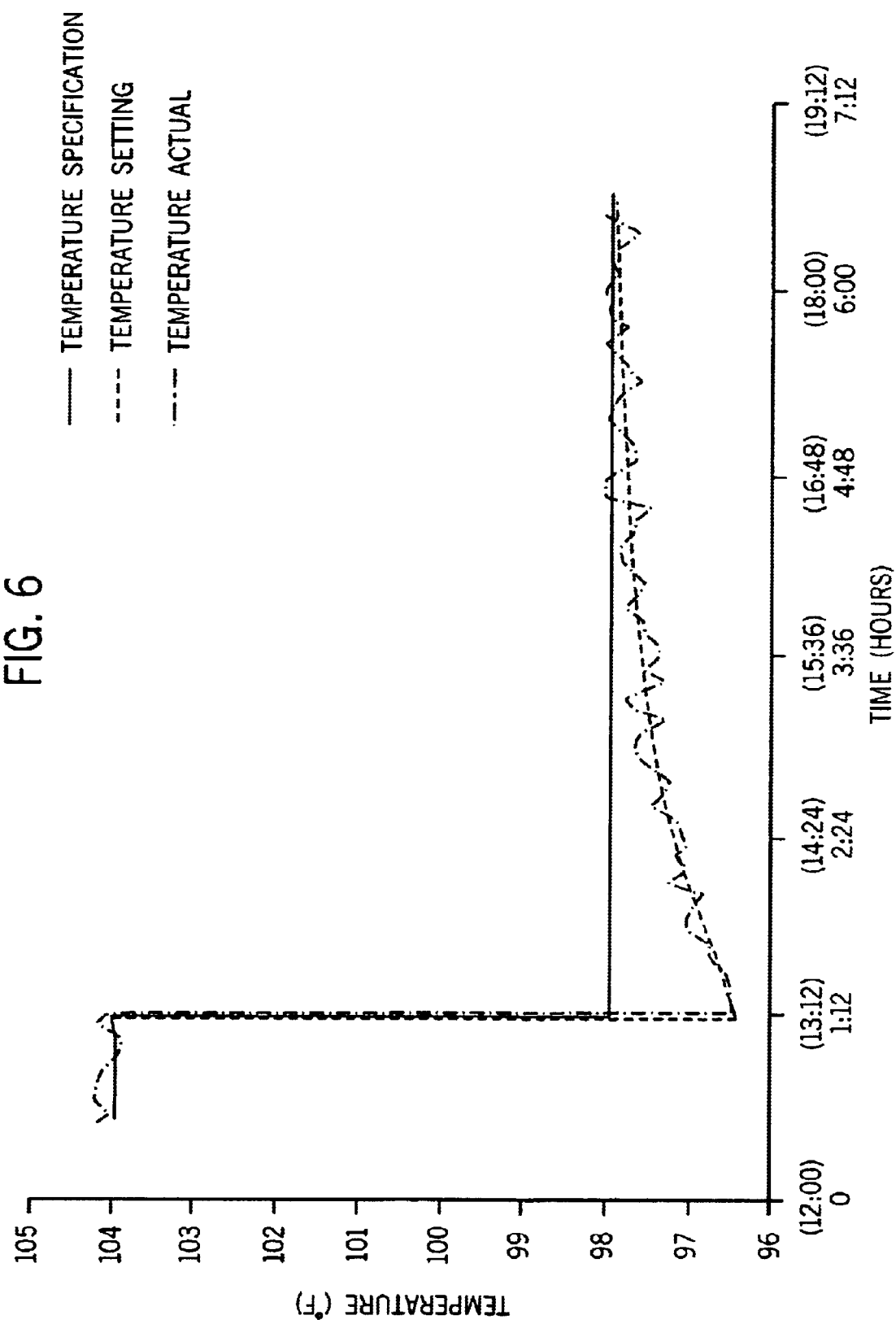

FIG. 6 illustrates the dynamics of modifying the bed temperature and actual temperature response. The solid line (⌐) represents the change in set point from a bed temperature of 104° C. to 98° C. At the start of the transition, the bed temperature was initially decreased to 96.5° C., as shown by the dashed line (- -), which was 1.5° C. below the target temperature of the second resin, in order to rapidly drive the resin flow property (melt index) to target. The temperature gradually increased (dashed line - - -) toward the target temperature of 98° C. as the averaged resin melt index neared the target value. The dotted/dashed line (-•-•-) represents the actual reactor temperature reading.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents. The disclosures of the cited patents and other references throughout the application are incorporated by reference herein.

What is claimed:

1. A method for modifying a resin flow property of a polymer during the course of a polymerization reaction from an initial flow property to a target flow property, the polymerization reaction having an initial reaction temperature and an initial gas composition, the method comprising the steps of:

A. Changing the initial reaction temperature to a temperature set point that is either above or below a target reaction temperature for producing the polymer with the target flow property, and concurrently altering the initial gas composition to move the initial resin flow property of the polymer toward the target resin flow property of the polymer; and B. Moving the temperature set point toward the target reaction temperature for the polymer as the resin flow property of the polymer moves toward the target resin flow property of the polymer.

2. The method of claim 1, wherein the step of moving the reaction temperature comprises moving the temperature set point toward the target reaction temperature more slowly than moving the initial reaction temperature to the temperature set point.

3. The method of claim 1, wherein the step of moving the reaction temperature comprises moving the initial reaction temperature to the temperature set point more rapidly than moving the temperature set point to the target reaction temperature.

4. The method of claim 1, wherein the temperature is moved in a stepped manner.

5. The method of claim 1, further comprising, after changing the initial reaction temperature to the temperature set point, the step of maintaining the temperature set point and gas composition until the resin flow property of the polymer is within 10 percent of the target resin flow property of the polymer.

6. The method of claim 1, wherein the target reaction temperature is lower than the initial reaction temperature, and the step of changing the initial reaction temperature comprises decreasing the initial reaction temperature to up to about 20° C. below the target reaction temperature for the polymer.

7. The method of claim 6, wherein the initial reaction temperature is decreased to about 1–3° C. below the target reaction temperature for the polymer.

8. The method of claim 1, wherein the target reaction temperature is higher than the initial reaction temperature, and the step of changing the initial reaction temperature comprises increasing the initial reaction temperature to up to about 20° C. above the target reaction temperature for the polymer.

9. The method of claim 8, wherein the initial reaction temperature is increased to about 1–3° C. above the target reaction temperature for the polymer.

10. The method of claim 1, further comprising, after the step of moving the temperature set point toward the target reaction temperature, the step of varying the gas composition to maintain the resin flow property at or about the target resin flow property of the polymer.

11. A method for modifying a resin flow value of a polymer during the course of a polymerization reaction, the polymer having an initial resin flow value and produced under an initial reaction temperature and an initial gas composition, the method comprising the steps of:

A. Reducing the initial reaction temperature by at least about 0.5° C. to up to about 20° C., and concurrently altering the gas composition to produce polymer having the target resin flow value; and B. Moving the temperature set point toward the target reaction temperature for the polymer as the resin flow value of the polymer approaches the target resin flow value of the polymer.

12. The method of claim 11, wherein the step of reducing the initial reaction temperature comprises reducing the initial reaction temperature to about 1–3° C. below the target reaction temperature for the polymer.

13. The method of claim 11, further comprising, after the step of moving the temperature set point, the step of varying the gas composition to maintain the resin flow value at or about the target resin flow value of the polymer.

14. The method of claim 11, further comprising, after the step of moving the temperature set point, the step of moving the reaction temperature about the target reaction temperature to maintain the resin flow value at about the target resin flow value.

15. The method of claim 11, wherein the gas composition comprises a gas selected from the group consisting of hydrogen and one or more α-olefins; and the step of altering the gas composition comprises reducing inflow of one or more of the gases to the polymerization reaction.

16. The method of claim 15, wherein the gas composition comprises hydrogen, and the step of altering the gas composition comprises reducing inflow of hydrogen gas to the polymerization reaction.

17. The method of claim 15, wherein the gas composition comprises an α-olefin, and the step of altering the gas composition comprises increasing inflow of the α-olefin gas to the polymerization reaction.

18. The method of claim 11, wherein the polymerization reaction comprises a gas phase polymerization.

19. The method of claim 18, wherein the polymerization occurs in a fluidized bed.

20. The method of claim 11, wherein the polymerization reaction comprises a solution polymerization.

21. The method of claim 11, wherein the polymerization reaction comprises use of a chromium-based catalyst system and oxygen add-back into the reactor, and inflow of the oxygen is varied to maintain the resin flow value at about the target resin flow value for the polymer.

22. The method of claim 11, wherein the polymerization reaction comprises use of a titanium-based catalyst and a co-catalyst, and an inflow of hydrogen and an α-olefin to the polymerization reaction at a set molar ratio; and the inflow of the hydrogen, the α-olefin, or both, is varied to maintain the resin flow value at about the target resin flow value for the polymer.

23. The method of claim 15, wherein at least one of the reaction temperature and the gas inflow are varied by a computerized control system.

24. The method of claim 15, wherein at least one of the reaction temperature and the gas inflow are varied manually.

25. A method for controlling a resin property of a polyolefin in a polymerization reaction, the polyolefin having an initial resin flow value and produced under an initial reaction temperature and an initial gas composition, the method comprising the steps of:

A. Increasing the initial reaction temperature to a temperature set point that is at least about 0.5° C. to up to about 20° C. above a target reaction temperature for producing the polyolefin with a target resin flow value, and concurrently altering the initial gas composition such that polyolefin is produced having the target resin flow value; and B. Moving the temperature set point toward the target reaction temperature for the polyolefin as the resin flow value of the polyolefin approaches the target resin flow value of the polyolefin.

26. The method of claim 25, wherein the step of increasing the initial reaction temperature to the temperature set point comprises increasing the initial reaction temperature to about 1–3° C. above the target reaction temperature for the polyolefin.

27. A method for producing a polyolefin and reducing off-grade polyolefin in a polymerization reaction, the polyolefin having an initial resin flow value and produced under an initial reaction temperature and an initial gas composition, the method comprising the steps of:

A. Monitoring the resin flow value of polyolefin during the course of the reaction and comparing the resin flow value to the target resin flow value of the polyolefin;

B. Reducing the initial reaction temperature to at least about 0.5° C. to up to about 20° C. below the target reaction temperature for the polyolefin, and concurrently altering inflow of one or more gases to alter the gas composition to the polymerization to produce polyolefin having the target resin flow value; and C. Moving the temperature set point toward the target reaction temperature for the polyolefin as the resin flow value of the polyolefin approaches the target resin flow value of the polyolefin.

28. The method of claim 27, wherein the step of reducing the initial reaction temperature comprises reducing the initial reaction temperature to about 1–3° C. below the target reaction temperature for the polyolefin.

29. A method for producing a polyolefin and reducing off-grade polyolefin in a continuous polymerization reaction, the polyolefin having an initial resin flow value and produced under an initial reaction temperature and an initial gas composition, the method comprising the steps of:
   A. Monitoring the resin flow value of the polyolefin and comparing the resin flow value to a target resin flow value of the polyolefin;
   B. Moving the initial reaction temperature to a temperature set point that is at least about 0.5° C. up to about 20° C. above or below a target reaction temperature for producing the polyolefin with the target resin flow value, and concurrently altering inflow of one or more gases to alter the initial gas composition to produce polyolefin having the target resin flow value; and
   C. Moving the temperature set point toward the target reaction temperature for the polyolefin as the resin flow value of the polyolefin moves toward the target resin flow value of the polyolefin.

30. The method of claim 29, wherein the step of moving the initial reaction temperature comprises moving the initial reaction temperature to about 1–3° C. above or below the target reaction temperature for the polyolefin.

31. A method for reducing off-grade polyolefin in a polymerization reaction during a transition from a first polyolefin to a second polyolefin, each of the first and second polyolefins having a resin flow property value and each produced under a reaction temperature and gas compositions, the resin flow value and the reaction temperature for the second polyolefin being lower than for the first polyolefin, the method comprising the steps of:
   moving the reaction temperature for the first polyolefin to establish a temperature set point that is up to about 20° C. below the reaction temperature for producing the second polyolefin, and concurrently altering inflow of one or more gases to the polymerization reaction for the first polyolefin to alter the gas composition so as to produce the second polyolefin; and
   moving the reaction temperature from the temperature set point toward the reaction temperature for the second polyolefin as the resin flow property value of the first polyolefin approaches the resin flow property value of the second polyolefin.

32. A method for reducing off-grade polyolefin in a polymerization reaction during a transition from a first polyolefin to a second polyolefin, each of the first and second polyolefins having a resin flow property value and each produced under a reaction temperature and gas composition, the resin flow value and defined reaction temperature for the second polyolefin being higher than for the first polyolefin the method comprising the steps of:
   moving the reaction temperature for the first polyolefin to establish a temperature set point that is up to about 20° C. above the reaction temperature for producing the second polyolefin, and concurrently altering inflow of one or more gases to the polymerization reaction for the first polyolefin to alter the gas composition so as to produce the second polyolefin; and
   moving the reaction temperature from the temperature set point toward the reaction temperature for the second polyolefin as the resin flow property value of the first polyolefin approaches the resin flow property value of the second polyolefin.

33. A method for controlling a continuous polymerization reaction when changing from a first polyolefin made at a first set of reaction conditions to a second polyolefin made at a second set of reaction conditions, each of the first and second polyolefins having a resin flow value different from the other and each of the reaction conditions comprising a reaction temperature and gas composition different from the other, the method comprising the steps of:
   comparing the reaction temperatures of the first polyolefin and of the second polyolefin;
   modifying the reaction temperature of the polymerization reaction for the first polyolefin and concurrently altering inflow of one or more gases to the polymerization reaction to alter the gas composition for producing the first polyolefin, whereby if the reaction temperature for the second polyolefin;
   a) is lower than the reaction temperature for the first polyolefin, decreasing the reaction temperature to establish a temperature set point up to about 20° C. below the reaction temperature for the second polyolefin; or
   b) is higher than the reaction temperature for the first polyolefin, increasing the reaction temperature to establish a temperatures set point up to about 20° C. above the reaction temperature for the second polyolefin; and
   moving the temperature set point toward the reaction temperature for the second polyolefin as the resin flow property value of the first polyolefin approaches the resin flow property value of the second polyolefin.

34. The method of claim 33, further comprising after the step of establishing temperature set point, the step of maintaining the temperature set point and the inflow of gases until the resin flow value is within ten percent of the resin flow value of the second polyolefin.

35. A continuous method for the polymerization of a polyolefin under polymerization conditions comprising a reaction temperature and a gas composition, the polyolefin having a resin flow value, the method comprising the steps of:
   monitoring the resin flow value of polyolefin and comparing the value to a target resin flow value of the polyolefin;
   upon detecting a resin flow value more than ten percent deviant from the target resin value of the polyolefin, changing the reaction temperature to establish a temperature set point that is above or below a target reaction temperature for the polyolefin, and concurrently altering inflow of one or more gases to alter the gas composition to produce polyolefin having the target resin flow value of the polyolefin; and
   moving the reaction temperature from the temperature set point toward the target reaction temperature for the polyolefin as the resin flow value of polyolefin approaches the target resin flow value of the polyolefin.

36. The method of claim 35, wherein the temperature set point is about 1–3° C. above or below the target reaction temperature.

37. The method of claim 35, wherein the polymerization reaction occurs in a fluidized bed.

38. The method of claim 35, wherein the polymerization conditions comprise a chromium-based catalyst system and oxygen add-back in flow, and the inflow of the oxygen is modified.

39. The method of claim 35, wherein the polymerization conditions comprise a titanium-based catalyst and co-catalyst system, and an inflow of hydrogen and an α-olefin to the polymerization reaction at a set molar ratio; and the inflow of at least one of the hydrogen and the α-olefin is modified.

40. A method for continuous polymerization of one or more alpha-olefins, under polymerization conditions comprising a reaction temperature and a gas composition molar ratio required for a desired resin flow property, the method comprising the steps of:

establishing limits on the reaction temperature and the gas composition molar ratio;

establishing a desired resin flow property;

determining the desired reaction temperature and gas composition for producing the desired resin flow property;

determining an actual resin flow property as the polymerization progresses;

if the actual resin flow property is more than ten percent different than the desired resin flow property, then establishing a temperature set point either below or above a target reaction temperature to drive the actual resin flow property toward the desired resin flow property;

determining the gas composition molar ratio required to drive the actual resin flow property towards the desired resin flow property;

determining the amounts of gas components required for the molar ratio;

changing the reaction temperature and at least one gas in amount necessary to satisfy the preceding steps;

moving the reaction temperature from the temperature set point toward the target reaction temperature while the gas composition moves the actual resin flow property toward the desired resin flow property; and adjusting the gas composition to maintain the desired resin flow properties.

\* \* \* \* \*